US012463246B2

United States Patent
Nishiyama (10) Patent No.: US 12,463,246 B2
(45) Date of Patent: Nov. 4, 2025

(54) BATTERY (71) Applicant: Panasonic Intellectual Property Management Co., Ltd., Osaka (JP)

(72) Inventor: Seiji Nishiyama, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 678 days.

(21) Appl. No.: 17/751,667

(22) Filed: May 24, 2022

(65) Prior Publication Data

US 2022/0285727 A1 Sep. 8, 2022

Related U.S. Application Data (63) Continuation of application No. PCT/JP2020/040478, filed on Oct. 28, 2020.

(30) Foreign Application Priority Data

Dec. 20, 2019 (JP) .................... 2019-230640

(51) Int. Cl.
H01M 10/0562 (2010.01)
H01M 10/0525 (2010.01)
(Continued)

(52) U.S. Cl.
CPC ... H01M 10/0562 (2013.01); H01M 10/0525 (2013.01); H01M 10/0585 (2013.01); H01M 50/207 (2021.01); H01M 50/543 (2021.01)

(58) Field of Classification Search
CPC ......... H01M 10/0562; H01M 10/0525; H01M 10/0585; H01M 10/058; H01M 50/207;
(Continued)

(56) References Cited

U.S. PATENT DOCUMENTS

2014/0212767 A1 7/2014 Suzuki et al.
2019/0173065 A1* 6/2019 Millon .................. H01M 50/28
2021/0143508 A1 5/2021 Yoshida

FOREIGN PATENT DOCUMENTS

CN 2935486 Y 8/2007
JP 6-349459 12/1994
(Continued)

OTHER PUBLICATIONS

International Search Report of PCT application No. PCT/JP2020/040478 dated Jan. 12, 2021.
(Continued)

*Primary Examiner* — Adam A Arciero
(74) *Attorney, Agent, or Firm* — Greenblum and Bernstein, P.L.C.

(57) ABSTRACT

The disclosed battery includes a laminated body and a housing. The laminated body includes first and second main surfaces, and a side surface parallel to a first direction which is the laminating direction. The housing includes a first housing portion including a first plate-shaped portion facing the first main surface, and a first side wall portion facing the side surface, and a second housing portion including a second plate-shaped portion facing the second main surface, and a second side wall portion facing the side surface. The first and second side wall portions include first and second projecting regions, respectively. The first and second side wall portions do not overlap each other when viewed from a second direction perpendicular to the side surface. The first and second projecting regions at least partially overlap each other when viewed from a third direction perpendicular to the first direction and along the side surface.

12 Claims, 5 Drawing Sheets (51) Int. Cl.
*H01M 10/0585* (2010.01)
*H01M 50/207* (2021.01)
*H01M 50/543* (2021.01)

(58) Field of Classification Search
CPC .. H01M 50/543; H01M 50/55; H01M 50/557; H01M 50/105; H01M 50/233; H01M 50/211
See application file for complete search history.

(56) References Cited

FOREIGN PATENT DOCUMENTS

| | | | | |
|---|---|---|---|---|
| JP | 2019-057436 | 4/2019 | | |
| WO | 2013/021432 | 2/2013 | | |
| WO | 2019/059002 | 3/2019 | | |
| WO | WO-2019059002 A1 * | 3/2019 | ........ | H01M 10/0585 |
| WO | 2019/123903 | 6/2019 | | |

OTHER PUBLICATIONS

English Language Translation of Chinese Search Report from the China National Intellectual Property Administration (CNIPA) dated Feb. 28, 2024 for the related Chinese Patent Application No. 202080025350.7.

* cited by examiner

BATTERY

BACKGROUND

1. Technical Field

The present disclosure relates to a battery.

2. Description of the Related Art

Batteries such as lithium-ion secondary batteries are used as batteries to be mounted on vehicles. Safety and weight reduction are requested for the batteries to be mounted on vehicles, in addition to capacity increase.

Conventional batteries such as lithium-ion secondary batteries in which an organic electrolyte is used involve the risk of hazards such as ignition, explosion, and flashing due to leakage. Therefore, all-solid-state secondary batteries (hereinafter referred to as "all-solid-state batteries") in which a solid electrolyte is used in place of an organic electrolyte are drawing attention.

While most conventional batteries to be mounted on vehicles are housed in a metal can exterior body for which metal plates are used, use of a laminated film exterior body which is made of a metal foil and a resin has been studied in order for weight reduction and size reduction.

Japanese Patent No. 5648747 discloses an all-solid-state battery in which an electrode body (cell laminated body) as a power generation element is housed in an exterior body of a laminated film.

Japanese Unexamined Patent Application Publication No. 2019-57436 discloses a battery housed in a laminated film so as to cover a pair of housings that house an all-solid-state battery laminated body as a power generation element and that each have a side wall that extends in the thickness direction of the all-solid-state battery laminated body.

SUMMARY

Reliable batteries are required in the conventional techniques. One non-limiting and exemplary embodiment provides a battery with enhanced reliability.

In one general aspect, the techniques disclosed here feature a battery including: a power generation element that includes a structural body in which a positive electrode, an electrolyte, and a negative electrode are laminated; and a housing that accommodates the power generation element, in which surfaces of the power generation element include a first main surface which is a flat surface that is perpendicular to a first direction which is a laminating direction of the power generation element, a second main surface which is a surface opposite from the first main surface, and a side surface which is a flat surface that is parallel to the first direction; the housing includes a first housing portion that includes a first plate-shaped portion that faces the first main surface, and a first side wall portion that extends from an end portion of the first plate-shaped portion to a side of the power generation element from the first plate-shaped portion, the first side wall portion facing the side surface, and a second housing portion that includes a second plate-shaped portion that faces the second main surface, and a second side wall portion that extends from an end portion of the second plate-shaped portion to a side of the power generation element from the second plate-shaped portion, the second side wall portion facing the side surface; the first side wall portion includes at least one first projecting region that projects in a direction in which the first side wall portion extends; the second side wall portion includes at least one second projecting region that projects in a direction in which the second side wall portion extends; the first side wall portion and the second side wall portion do not overlap each other when viewed from a second direction which is perpendicular to the side surface; and the at least one first projecting region and the at least one second projecting region at least partially overlap each other when viewed from a third direction which is perpendicular to the first direction and which extends along the side surface.

With the present disclosure, the reliability of the battery can be enhanced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge which Led to Aspect of the Present Disclosure

The inventors have found that the following problems are caused when enhancing the reliability of a battery, in particular an all-solid-state battery, by protecting the battery using a housing etc.

With the configuration described in Japanese Patent No. 5648747 discussed above, in which an exterior body of a film material is used, an electrode body in the exterior body is not protected sufficiently, and the electrode body may be damaged or peeled because of an external force such as impact and vibration.

With the configuration described in Japanese Unexamined Patent Application Publication No. 2019-57436 discussed above, a stress concentrates on the laminated film at an end portion of the side wall of the housings, which may cause a break in the laminated film or a defect in the laminated film due to a reduction in the mechanical strength of the laminated film. Further, the respective side walls of the pair of housings overlap each other in the direction toward the outer side of the all-solid-state battery laminated body, which may increase a volume that does not contribute to the power generation capacity and lower a volumetric energy density.

Figure 1:
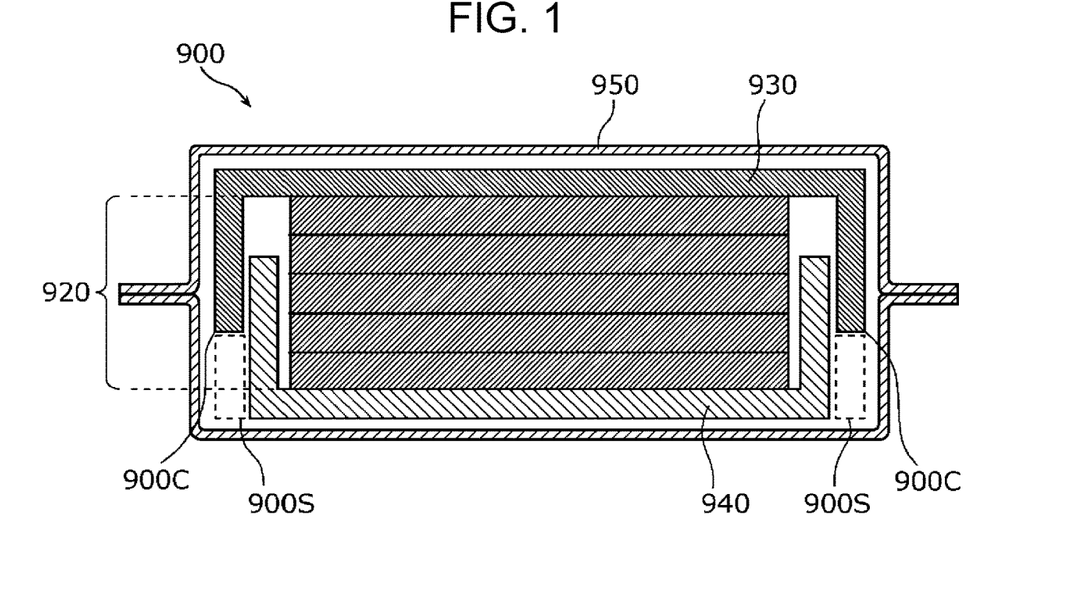
FIG. 1 is a sectional view illustrating a schematic configuration of a battery according to a comparative example.

The issue with Japanese Unexamined Patent Application Publication No. 2019-57436 is described with reference to a drawing. FIG. 1 is a sectional view illustrating a schematic configuration of a battery 900 according to a comparative example of the present disclosure. The battery 900 according to the comparative example includes an all-solid-state battery laminated body 920 (i.e. power generation element) that includes a plurality of all-solid-state battery cells which are laminated, an upper housing portion 930 and a lower housing portion 940 disposed on the upper surface and the lower surface, respectively, of the all-solid-state battery laminated body 920, and a flexible exterior body 950 that covers the upper housing portion 930 and the lower housing portion 940.

The upper housing portion 930 and the lower housing portion 940 are uniformly pressurized by atmospheric pressure when a sealed space in the flexible exterior body 950 is depressurized. In this event, the flexible exterior body 950 tightly contacts end portions 900C of the upper housing portion 930, and a stress applied from the upper housing portion 930 to the flexible exterior body 950 concentrates at the end portions 900C. Therefore, a break, a defect, etc. in the flexible exterior body 950 may be caused at locations at which the end portions 900C and the flexible exterior body 950 contact each other. Hence, the reliability of the battery 900 may be lowered.

Further, the respective side walls of the upper housing portion 930 and the lower housing portion 940 overlap each other in the direction toward the outer side of the all-solid-state battery laminated body, which creates spaces 900S which do not contribute to the power generation capacity and lowers the volumetric energy density of the battery 900. In this manner, the effect of the housings and the flexible exterior body 950 in enhancing the reliability is not sufficient, and the volumetric energy density of the battery 900 is lowered.

In view of the foregoing issue, one non-limiting and exemplary embodiment provides a battery with enhanced reliability and an increased energy density by covering a power generation element of the battery using a housing and suppressing a reduction in the volumetric energy density of the battery. The embodiment also provides a battery with further enhanced reliability in the case where the housing is covered by an exterior body such as a laminated film, by suppressing the occurrence of a break or a defect in the exterior body.

An aspect of the present disclosure will be summarized below.

An aspect of the present disclosure provides a battery including: a power generation element that includes a structural body in which a positive electrode, an electrolyte, and a negative electrode are laminated; and a housing that accommodates the power generation element, in which surfaces of the power generation element include a first main surface which is a flat surface that is perpendicular to a first direction which is a laminating direction of the power generation element, a second main surface which is a surface opposite from the first main surface, and a side surface which is a flat surface that is parallel to the first direction; the housing includes a first housing portion that includes a first plate-shaped portion that faces the first main surface, and a first side wall portion that extends from an end portion of the first plate-shaped portion to a side of the power generation element from the first plate-shaped portion, the first side wall portion facing the side surface, and a second housing portion that includes a second plate-shaped portion that faces the second main surface, and a second side wall portion that extends from an end portion of the second plate-shaped portion to a side of the power generation element from the second plate-shaped portion, the second side wall portion facing the side surface; the first side wall portion includes at least one first projecting region that projects in a direction in which the first side wall portion extends; the second side wall portion includes at least one second projecting region that projects in a direction in which the second side wall portion extends; the first side wall portion and the second side wall portion do not overlap each other when viewed from a second direction which is perpendicular to the side surface; and the at least one first projecting region and the at least one second projecting region at least partially overlap each other when viewed from a third direction which is perpendicular to the first direction and which extends along the side surface.

Consequently, the power generation element is covered by the housing, and therefore the power generation element is protected from external impact etc. The first projecting region of the first side wall portion and the second projecting region of the second side wall portion at least partially overlap each other when viewed from the third direction, and therefore one of the first side wall portion and the second side wall portion is not likely to protrude outward of the power generation element with respect to the other. Therefore, a space that does not contribute to the power generation capacity, which is formed in the case where the first side wall portion or the second side wall portion protrudes outward of the power generation element, is not likely to be formed, which improves the volumetric energy density of the battery. Even in the case where the housing is further covered by an exterior body and the exterior body contacts the housing, it is possible to reduce a stress on the exterior body due to contact between an end portion of the first side wall portion and an end portion of the second side wall portion and the exterior body, since one of the first side wall portion and the second side wall portion is not likely to protrude outward of the power generation element with respect to the other. As a result, the occurrence of a break or a defect in the exterior body is suppressed. Hence, it is possible to enhance the reliability and the energy density of the battery according to the present aspect.

A surface of the first side wall portion on a side opposite from the side surface and a surface of the second side wall portion on a side opposite from the side surface may be positioned on the same flat plane with each other, for example.

Consequently, there is no step between the surface of the first side wall portion on the side opposite from the side surface and the surface of the second side wall portion on the side opposite from the side surface. Therefore, a space that does not contribute to the power generation capacity is not formed by a step, which further improves the volumetric energy density of the battery. In addition, one of the first side wall portion and the second side wall portion does not protrude outward of the power generation element with respect to the other. Therefore, even in the case where the housing is further covered by an exterior body and the exterior body contacts the housing, an end portion of the first side wall portion and an end portion of the second side wall portion, at which a stress tends to concentrate, and the exterior body are not likely to contact each other, which further suppresses the occurrence of a break or a defect in the exterior body.

A first projecting region and a second projecting region that are adjacent to each other in the third direction, among the at least one first projecting region and the at least one second projecting region, may contact each other, for example.

Consequently, the first projecting region and the second projecting region which are adjacent to each other in the third direction serve as a stopper when external impact in the third direction is applied, which suppresses misalignment of the first housing portion and the second housing portion in the third direction. Therefore, a damage to the power generation element is suppressed.

A gap may be present between a first projecting region and a second projecting region that are adjacent to each other in the third direction, among the at least one first projecting region and the at least one second projecting region, for example.

Consequently, generation of dust due to the material of the housing being worn because of friction between the first projecting region and the second projecting region etc. is suppressed. Hence, it is possible to reduce the possibility that the material of the housing adheres to the power generation element to cause a reduction in performance, a short circuit, etc., which improves the reliability of the battery.

A gap may be present between the at least one first projecting region and the second plate-shaped portion and between the at least one second projecting region and the first plate-shaped portion when viewed from the second direction, for example.

Consequently, in the case where the housing is covered by an exterior body and a pressure is applied with the sealed space in the exterior body depressurized etc., the pressure is applied to the battery cell laminated body via the first housing portion and the second housing portion, and the power generation element is compressed in the laminating direction. As a result, in the case where particles of a solid electrolyte etc. are present in the power generation element, a gap between the particles of the material that are present in the power generation element can be reduced by allowing deformation of the solid electrolyte which is relatively soft, allowing the particles to move so as to fill the gap, etc. Therefore, the density of the power generation element is enhanced to reduce the resistance between the particles while improving the volumetric energy density, which improves the battery characteristics.

The at least one first projecting region may include a plurality of first projecting regions arranged along the third direction, and the at least one second projecting region may include a plurality of second projecting regions arranged along the third direction, for example.

Consequently, the side surface of the power generation element is covered by the plurality of first projecting regions and the plurality of second projecting regions, and therefore the effect of protecting the side surface of the power generation element can be enhanced.

First projecting regions and second projecting regions, among the plurality of first projecting regions and the plurality of second projecting regions, may be arranged alternately along the third direction, for example.

Consequently, the first projecting regions and the second projecting regions are meshed with each other, which suppresses misalignment of the first housing portion and the second housing portion in the third direction due to impact applied in the third direction.

At least either of respective lengths of the plurality of first projecting regions in the third direction and respective lengths of the plurality of second projecting regions in the third direction may not be uniform, for example.

Consequently, the plurality of first projecting regions include first projecting regions with a long length in the third direction and first projecting regions with a short length in the third direction, for example. The first projecting regions with a long length in the third direction tend to contact second projecting regions that are adjacent thereto in the third direction, which suppresses misalignment of the first housing portion and the second housing portion in the third direction due to impact applied in the third direction. On the other hand, the first projecting regions with a short length in the third direction do not tend to contact second projecting regions that are adjacent thereto in the third direction. Therefore, generation of dust due to the material of the housing being worn because of friction between the first projecting region and the second projecting region etc. is suppressed. Hence, both misalignment of the first housing portion and the second housing portion in the third direction and generation of dust can be suppressed. The same also applies to a case where the plurality of second projecting regions include second projecting regions with different lengths in the third direction.

At least either of respective lengths of the plurality of first projecting regions in the first direction and respective lengths of the plurality of second projecting regions in the first direction may not be uniform, for example.

Consequently, the plurality of first projecting regions include first projecting regions with a long length in the first direction and first projecting regions with a short length in the first direction, for example. Therefore, the first projecting regions with a long length in the first direction and the second housing portion (e.g. the second plate-shaped portion of the second housing portion) contact each other to function as a stopper when the housing is compressed from both sides in the first direction, which suppresses the power generation element being compressed to a certain degree or more. On the other hand, the first projecting regions with a short length in the first direction do not tend to contact the second housing portion. Therefore, generation of dust due to the material of the housing being worn because of friction between the second housing portion and the first projecting regions etc. is suppressed. The same also applies to a case where the plurality of second projecting regions include second projecting regions with different lengths in the first direction.

A length of the first side wall portion in the second direction and a length of the second side wall portion in the second direction may be different from each other, for example.

Consequently, one of the first side wall portion and the second side wall portion is thinner, which reduces the weight of the battery and improves the weight energy density of the battery.

The battery may further include an exterior body that covers the housing, for example.

Consequently, the power generation element is covered by the exterior body from the outside of the housing. Therefore, the power generation element is protected from moisture, air, etc. Hence, the reliability of the battery can be further enhanced.

The exterior body may be flexible, for example.

Consequently, the exterior body easily conforms to the shape of the outer surface of the housing, which enhances the sealing performance of the exterior body.

The exterior body may be constituted of a laminated film, for example.

Consequently, the exterior body has a layer structure with a metal layer and a resin layer. Therefore, the power generation element is protected by the exterior body which is highly flexible because of having a resin layer and which has good barrier properties against air and water because of having a metal layer.

The electrolyte may include a solid electrolyte that has lithium ion conductivity, for example.

Consequently, it is possible to enhance the reliability and the energy density of a lithium-ion battery that includes a solid electrolyte.

An embodiment will be specifically described below with reference to the drawings.

The embodiment to be described below indicates a generic or specific example.

The numerical values, shapes, materials, constituent elements, arrangement, position, and manner of connection of the constituent elements, etc. indicated in the following embodiment are exemplary, and are not intended to limit the present disclosure.

Herein, the terms that indicate the relationship between the elements such as "parallel", the terms that indicates the shape of the elements such as "flat" and "rectangular", and the numerical ranges represent not only the exact meanings of the expressions, but also substantially equivalent ranges including differences of several percent, for example.

The drawings are not necessarily exact illustrations. In the drawings, substantially identical components are denoted by like reference numerals to omit redundant description.

Herein and in the drawings, the x axis, the y axis, and the z axis indicate three axes of a three-dimensional orthogonal coordinate system. In the embodiment, the z-axis direction is defined as the laminating direction of layers of a power generation element. The positive direction along the z axis is defined as the upper side in the z-axis direction. The negative direction along the z axis is defined as the lower side in the z-axis direction.

The terms "above" and "below" as used herein for the components of a battery and a laminated battery do not indicate the upper direction (vertically upper) and the lower direction (vertically lower) in the absolute space recognition, and are used as terms prescribed in accordance with the relative positional relationship which is based on the laminating order of laminated components. The terms "above" and "below" are applied not only to the case where two constituent elements are disposed with a space therebetween and with another constituent element present between the two constituent elements, but also to the case where the two constituent elements are disposed in tight contact with each other.

EMBODIMENT

Configuration

Figure 2:
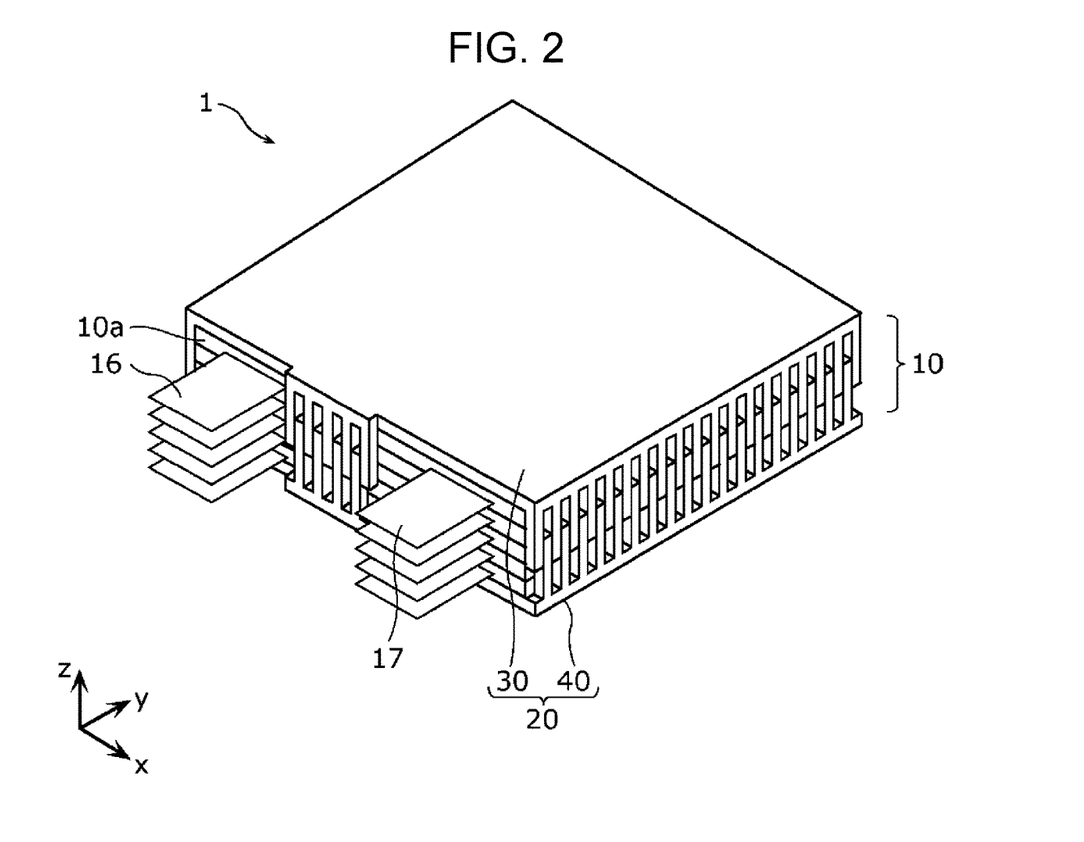
FIG. 2 is a perspective view illustrating a schematic configuration of a battery according to an embodiment.

First, a schematic configuration of a battery according to an embodiment will be described. FIG. 2 is a perspective view illustrating a schematic configuration of a battery 1 according to the present embodiment. In FIG. 2, an exterior body 50 to be discussed later is not illustrated in order to illustrate the structure of a housing 20.

As illustrated in FIG. 2, the battery 1 according to the present embodiment includes a battery cell laminated body 10 that includes battery cells 10a, and a housing 20 that accommodates the battery cell laminated body 10. Herein, the battery cells 10a are an example of the structural body, and the battery cell laminated body 10 is an example of the power generation element. The battery 1 may further include an exterior body 50 that covers the housing 20, although not illustrated in FIG. 2. The battery 1 is an all-solid-state battery, for example.

The battery cells 10a each have a structure in which a positive electrode, an electrolyte, and a negative electrode are laminated in this order. The electrolyte is constituted of a solid electrolyte layer, for example. The positive electrode is constituted of a positive electrode current collector, and a positive electrode active material layer positioned between the positive electrode current collector and the solid electrolyte layer, for example. The negative electrode is constituted of a negative electrode current collector, and a negative electrode active material layer positioned between the negative electrode current collector and the solid electrolyte layer, for example. That is, the battery cells 10a may each have a structure in which the positive electrode current collector, the positive electrode active material layer, the solid electrolyte layer, the negative electrode active material layer, and the negative electrode current collector are laminated in this order. The plurality of battery cells 10a may have a structure in which adjacent battery cells 10a share a positive electrode current collector or a negative electrode current collector. A side surface of each layer of the plurality of battery cells 10a may be covered by a sealing member constituted from a sealing resin etc.

In the example illustrated in FIG. 2, the plurality of battery cells 10a are laminated so as to be electrically connected in parallel. The plurality of battery cells 10a may be laminated in any manner as long as the battery cells 10a function as a battery, and may be laminated so as to be electrically connected in series, for example.

The battery cell laminated body 10 has a structure in which the plurality of battery cells 10a are laminated in the z-axis direction. The number of the battery cells 10a included in the battery cell laminated body 10 may not be two or more, and the battery cell laminated body 10 may be constituted of a single battery cell 10a. Terminals 16 and 17 electrically connected to the positive electrode current collector and the negative electrode current collector, respectively, of each battery cell 10a are led out from a side surface of the battery cell laminated body 10.

A known material may be used as the material of the positive electrode current collector and the negative electrode current collector. The positive electrode current collector and the negative electrode current collector may be a foil-like body, a plate-shaped body, or a mesh-like body made of copper, aluminum, nickel, iron, stainless steel, platinum, or gold, an alloy of two or more kinds thereof, etc., for example.

The positive electrode active material layer includes at least a positive electrode active material, and may include at least one of a solid electrolyte, a conductive assistant, and a binding agent (binder) as necessary.

The positive electrode active material may be a known material that allows occlusion and release (insertion and desorption, or dissolution and precipitation) of lithium ions, sodium ions, or magnesium ions. Examples of the positive electrode active material as a material that allows separation and insertion of lithium ions include a lithium cobalt composite oxide (LCO), a lithium nickel composite oxide (LNO), a lithium manganese composite oxide (LMO), a lithium manganese nickel composite oxide (LMNO), a lithium manganese cobalt composite oxide (LMCO), a lithium nickel cobalt composite oxide (LNCO), a lithium nickel manganese cobalt composite oxide (LNMCO), etc.

The solid electrolyte may be a known material such as a lithium ion conductor, a sodium ion conductor, and a magnesium ion conductor. The solid electrolyte may be either of an inorganic solid electrolyte and a solid polyelectrolyte (including a gel-like solid electrolyte). Examples of the inorganic solid electrolyte include a solid sulfide electrolyte, a solid oxide electrolyte, etc. Examples of the solid sulfide electrolyte as a material that conducts lithium ions include a synthetic material made of lithium sulfide ($Li_2S$) and phosphorus pentasulfide ($P_2S_5$). Alternatively, the solid sulfide electrolyte may be a sulfide such as $Li_2S$—$SiS_2$, $Li_2S$—$B_2S_3$, and $Li_2S$—$GeS_2$, and may be a sulfide obtained by adding to the above sulfide at least one of $Li_3N$, $LiCl$, $LiBr$, $Li_3PO_4$, and $Li_4SiO_4$ as an additive.

Examples of the solid oxide electrolyte as a material that conducts lithium ions include $Li_7La_3Zr_2O_{12}$ (LLZ), $Li_{1.3}Al_{0.3}Ti_{1.7}(PO_4)_3$ (LATP), $(La,Li)TiO_3$ (LLTO), etc.

Examples of the conductive assistant include a conductive material such as acetylene black, carbon black, graphite, and carbon fibers. Examples of the binding agent include a binder for binding such as a polyvinylidene fluoride.

The negative electrode active material layer includes at least a negative electrode active material, and may include at least one of a solid electrolyte, a conductive assistant, and a binding agent as necessary, as with the positive electrode active material layer.

The negative electrode active material may be a known material that allows occlusion and release (insertion and desorption, or dissolution and precipitation) of lithium ions, sodium ions, or magnesium ions. Examples of the negative electrode active material as a material that allows separation and insertion of lithium ions include a carbon material such as natural graphite, artificial graphite, graphite carbon fibers, and resin sintered carbon, metallic lithium, a lithium alloy, an oxide of lithium and a transition metal element, etc.

The solid electrolyte layer includes at least a solid electrolyte, and may include a binding agent as necessary. The solid electrolyte layer may include a solid electrolyte that has lithium ion conductivity.

The solid electrolyte and the binding agent may be the solid electrolyte and the binding agent described above.

The housing 20 is a housing that covers the surface of the battery cell laminated body 10 to protect the battery cell laminated body 10 from external impact etc. The housing 20 includes a first housing portion 30 and a second housing portion 40. The battery 1 may include a buffer material provided between the battery cell laminated body 10 and at least one of the first housing portion 30 and the second housing portion 40 to absorb impact. The corner portions of the housing 20 may be chamfered. That is, the housing 20 may have a structure with rounded corner portions. The battery cell laminated body 10 and the first housing portion 30 and the second housing portion 40 may be joined to each other by an adhesive, solder, etc. The first housing portion 30 and the second housing portion 40 may be joined to each other by an adhesive, solder, etc.

Examples of the material of the housing 20 include a conductive material such as metal and an insulating material such as a ceramic and a resin. From the viewpoint of ease of shape forming, the material of the housing 20 may be a conductive material such as metal. In the case where the material of the housing 20 is a conductive material such as metal, the housing 20 and the battery cell laminated body 10 are electrically insulated from each other by isolating the housing 20 and the battery cell laminated body 10 from each other using an insulating member, covering the housing 20 or the battery cell laminated body 10 with an insulating layer, etc.

Figure 3:
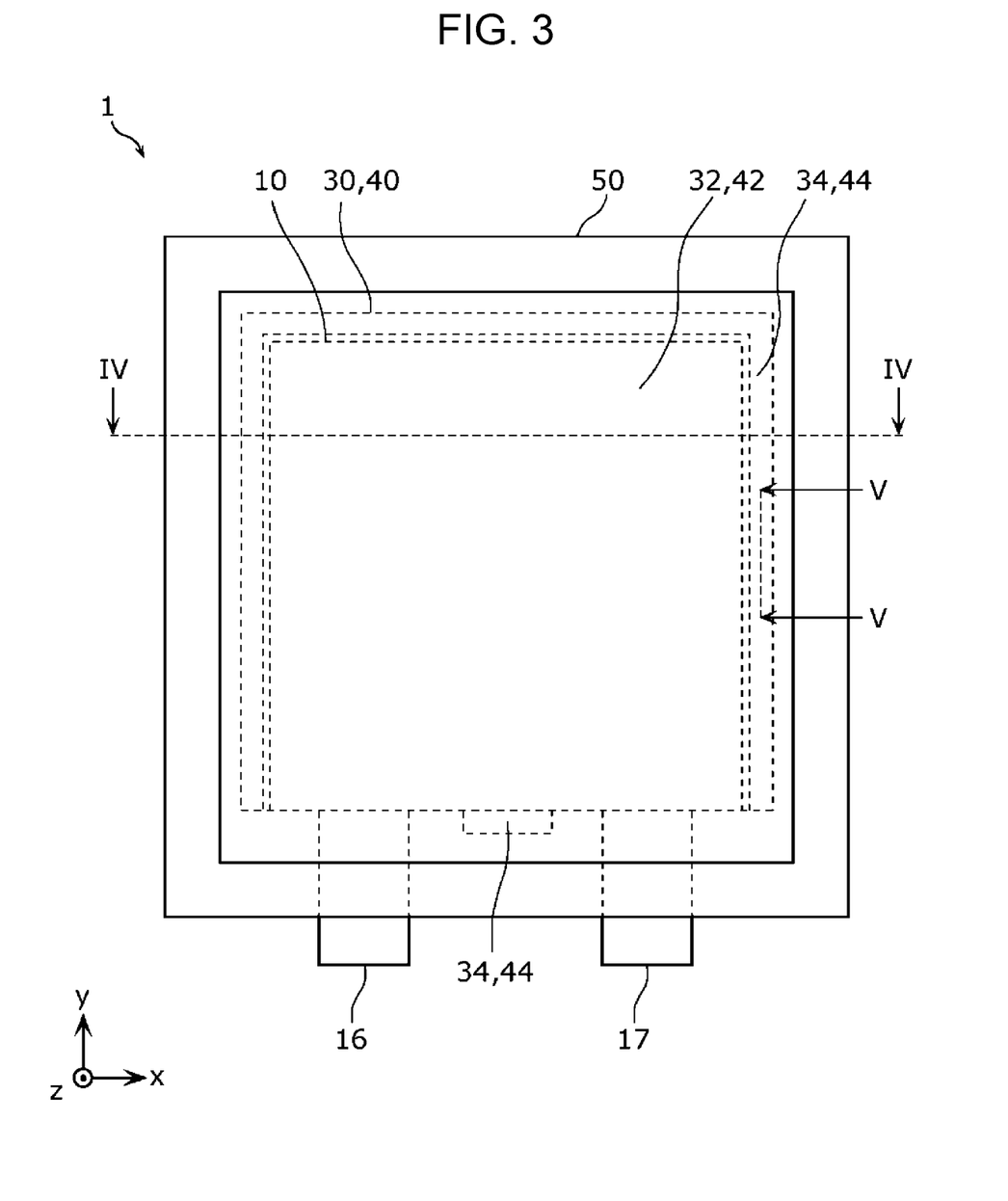
FIG. 3 is a top view illustrating a schematic configuration of the battery according to the embodiment.
Figure 4:
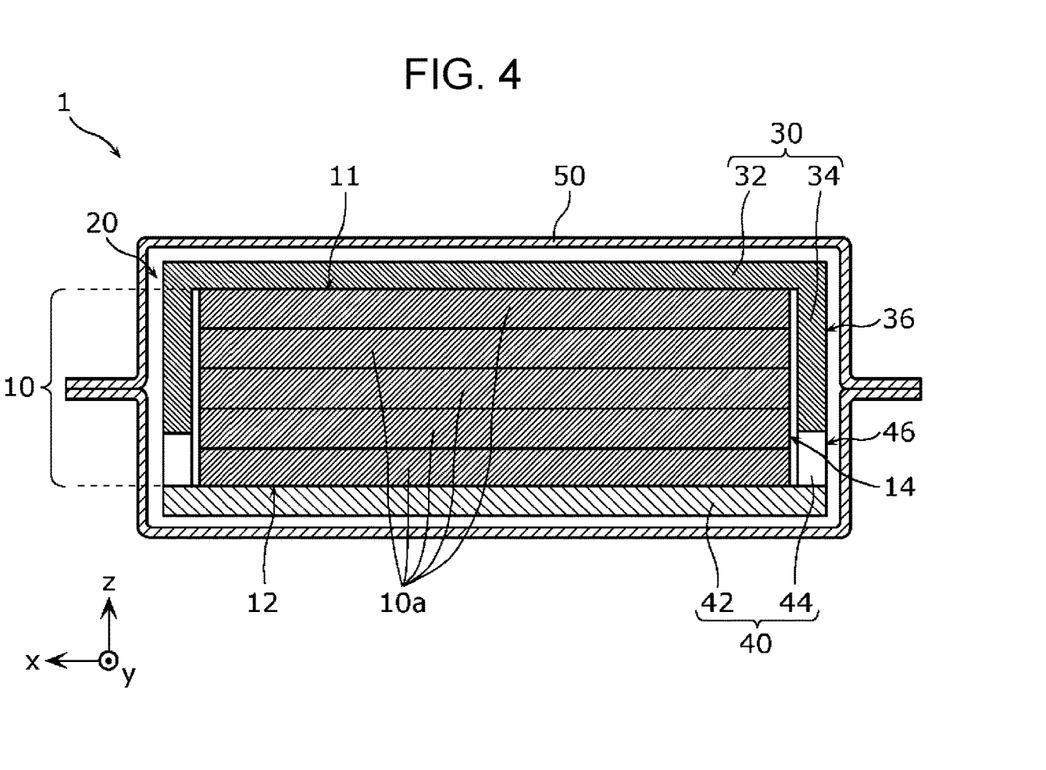
FIG. 4 is a sectional view taken at a position indicated by the line IV-IV in FIG. 3.
Figure 5:
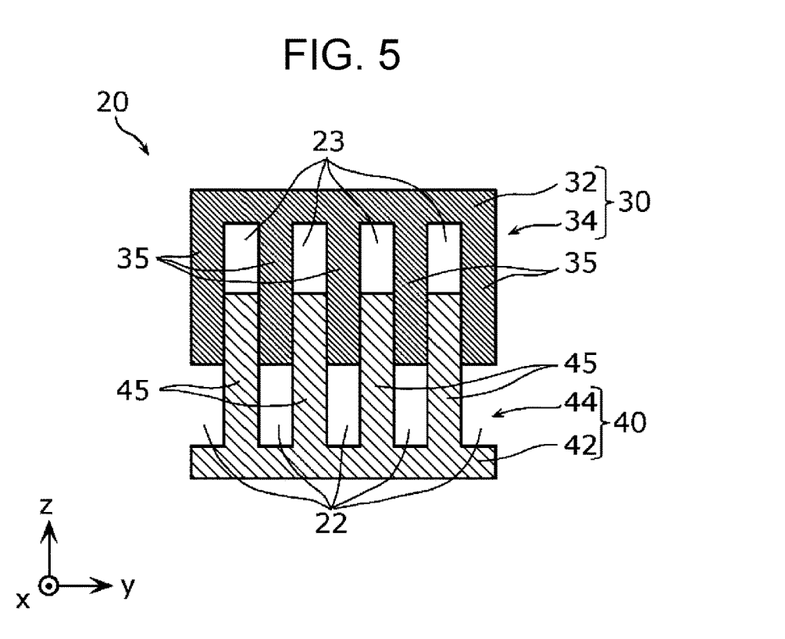
FIG. 5 is a sectional view taken at a position indicated by the line V-V in FIG. 3.

Next, constituent members of the battery 1 according to the present embodiment will be described in detail with reference to FIGS. 3 to 5. FIG. 3 is a top view illustrating a schematic configuration of the battery 1 according to the present embodiment. FIG. 4 is a sectional view taken at a position indicated by the line IV-IV in FIG. 3. FIG. 5 is a sectional view taken at a position indicated by the line V-V in FIG. 3. In FIG. 5, only the structure of the housing 20, of the sectional structure at the position indicated by the line V-V in FIG. 3, is illustrated. That is, the battery cell laminated body 10 and the exterior body 50 are not illustrated in FIG. 5.

The battery cell laminated body 10 has a rectangular parallelepiped shape or a cubic shape, for example. The surface of the battery cell laminated body 10 includes a first main surface 11 which is a flat surface that is perpendicular to a first direction (z-axis direction in the present embodiment) which is the laminating direction of the battery cell laminated body 10, a second main surface 12 which is a surface on the opposite side from the first main surface 11, and side surfaces 14 which are each a flat surface that is parallel to the first direction and that connects respective end portions of the first main surface 11 and the second main surface 12.

The housing 20 includes a first housing portion 30 that covers the first main surface 11 and a part of the side surfaces 14, and a second housing portion 40 that covers the second main surface 12 and a part of the side surfaces 14. The housing 20 is positioned between the battery cell laminated body 10 and the exterior body 50.

The first housing portion 30 includes a first plate-shaped portion 32 that faces the first main surface 11, and first side wall portions 34 that extend from an end portion of the first plate-shaped portion 32 to the side of the battery cell laminated body 10 from the first plate-shaped portion 32 and that face the side surfaces 14. The second housing portion 40 includes a second plate-shaped portion 42 that faces the second main surface 12, and second side wall portions 44 that extend from an end portion of the second plate-shaped portion 42 to the side of the battery cell laminated body 10 from the second plate-shaped portion 42 and that face the side surfaces 14.

The first plate-shaped portion 32 has a rectangular plate shape when viewed from the first direction, for example, and is disposed in parallel with the first main surface 11. The first plate-shaped portion 32 completely covers the first main surface 11, and overlaps the battery cell laminated body 10 when viewed from the first direction.

The first side wall portions 34 are each a plate-shaped side wall provided to extend perpendicularly to the first plate-shaped portion 32, and are disposed in parallel with the side surfaces 14. The first side wall portion 34 is provided at four locations so as to face each of all the side surfaces 14 of the battery cell laminated body 10. The first side wall portions 34 and the side surfaces 14 may be spaced from each other, or may contact each other.

The first side wall portions 34 each include first projecting regions 35 that project in a direction in which the first side wall portion 34 extends. The first side wall portions 34 each include a plurality of first projecting regions 35. The number of the first projecting regions 35 included in each of the first side wall portions 34 is not specifically limited, and may be one or two or more. The first projecting regions 35 are directly connected to an end portion of the first plate-shaped portion 32. Therefore, the first side wall portions 34 are each constituted from a plurality of first projecting regions 35. The first projecting regions 35 are each in a rectangular shape which has two sides that are perpendicular to the first main surface 11 when viewed from a second direction (x-axis direction in the example illustrated in FIG. 5) which is perpendicular to the side surface 14 which faces the first side wall portion 34 and the second side wall portion 44. The length from the first plate-shaped portion 32 to the distal end portions of the first projecting regions 35 in the first direction is equal to or less than the length of the battery cell laminated body 10 in the first direction.

The second plate-shaped portion 42 has a rectangular plate shape when viewed from the first direction, for example, and is disposed in parallel with the second main surface 12. The second plate-shaped portion 42 completely covers the second main surface 12, and overlaps the battery cell laminated body 10 when viewed from the first direction. The second plate-shaped portion 42 has the same shape, and is at the same position, as the first plate-shaped portion 32 when viewed from the first direction, for example.

The second side wall portions 44 are each a plate-shaped side wall provided to extend perpendicularly to the second plate-shaped portion 42, and are disposed in parallel with the side surfaces 14. That is, the first side wall portion 34 and the second side wall portion 44 extend in the first direction. The second side wall portion 44 is provided at four locations so as to face each of all the side surfaces 14 of the battery cell laminated body 10. The second side wall portions 44 and the side surfaces 14 may be spaced from each other, or may contact each other.

The second side wall portions 44 each include second projecting regions 45 that project in a direction in which the second side wall portion 44 extends. The second side wall portions 44 each include a plurality of second projecting regions 45. The number of the second projecting regions 45 included in each of the second side wall portions 44 is not specifically limited, and may be one or two or more. The second projecting regions 45 are directly connected to an end portion of the second plate-shaped portion 42. Therefore, the second side wall portions 44 are each constituted from a plurality of second projecting regions 45. The second projecting regions 45 are each in a rectangular shape which has two sides that are perpendicular to the second main surface 12 when viewed from the second direction. The length from the second plate-shaped portion 42 to the distal end portions of the second projecting regions 45 in the first direction is equal to or less than the length of the battery cell laminated body 10 in the first direction.

The first side wall portion 34 and the second side wall portion 44 do not overlap each other when viewed from the second direction. The first projecting regions 35 and the second projecting regions 45 at least partially overlap each other when viewed from a third direction (y-axis direction in the example illustrated in FIG. 5) which is perpendicular to the first direction and which extends along the side surface 14 which faces the first side wall portion 34 and the second side wall portion 44. Consequently, the side surface 14 of the battery cell laminated body 10 is protected by the first side wall portion 34 and the second side wall portion 44. In addition, one of the first side wall portion 34 and the second side wall portion 44 is not likely to protrude outward of the battery cell laminated body 10 with respect to the other. Therefore, the housing 20 is uniformly pressurized by atmospheric pressure via the exterior body 50 when the sealed space in the exterior body 50 is depressurized, and a stress on the exterior body 50 due to contact between an end portion of the first side wall portion 34 and an end portion of the second side wall portion 44 and the exterior body 50 can be reduced even if the housing 20 and the exterior body 50 contact each other. As a result, the occurrence of a break or a defect in the exterior body 50 is suppressed. Hence, the reliability of the battery 1 can be enhanced. In addition, a space (e.g. the space 900S discussed above) that does not contribute to the power generation capacity, which is formed in the case where the first side wall portion 34 or the second side wall portion 44 protrudes outward of the battery cell laminated body 10 when the first side wall portion 34 and the second side wall portion 44 overlap each other when viewed from the second direction, is not likely to be formed, which improves the volumetric energy density of the battery 1.

The total of the area in which the first side wall portion 34 and the side surface 14 overlap each other when viewed from the second direction and the area in which the second side wall portion 44 and the side surface 14 overlap each other may be equal to or more than 25% of the area of the side surface 14, may be equal to or more than 40% of the area of the side surface 14, or may be equal to or more than 60% of the area of the side surface 14. In addition, the total of the area in which the first side wall portion 34 and the side surface 14 overlap each other when viewed from the second direction and the area in which the second side wall portion 44 and the side surface 14 overlap each other may be equal to or less than 100% of the area of the side surface 14, or may be equal to or less than 80% of the area of the side surface 14.

The length, in the second direction, of a portion of overlap between the first projecting regions 35 and the second projecting regions 45 when viewed from the third direction may be equal to or more than 50%, may be equal to or more than 75%, or may be 100%, of the shorter one of the length of the first projecting regions 35 in the second direction and the length of the second projecting regions 45 in the second direction.

The plurality of first projecting regions 35 and the plurality of second projecting regions 45 are disposed in a comb teeth arrangement so as to be meshed with each other. That is, the first side wall portion 34 and the second side wall portion 44 have a comb teeth structure. The plurality of first projecting regions 35 are arranged at equal intervals along the third direction. The plurality of second projecting regions 45 are arranged at equal intervals along the third direction, the intervals being equal to the intervals at which the plurality of first projecting regions 35 are arranged. The first projecting regions 35 and the second projecting regions 45 are positioned such that one second projecting region 45 is interposed between two first projecting regions 35 and one first projecting region 35 is interposed between two second projecting regions 45. Therefore, the first projecting regions 35 and the second projecting regions 45 are arranged along the third direction. Consequently, the first projecting regions 35 and the second projecting regions 45 are meshed with each other, which suppresses misalignment of the first housing portion 30 and the second housing portion 40 in the third direction due to impact applied in the third direction. With the first projecting regions 35 and the second projecting regions 45 arranged alternately, external impact tends to be distributed to the first side wall portion 34 and the second side wall portion 44.

A surface 36 of the first side wall portion 34 on the opposite side from the side of the side surface 14 and a surface 46 of the second side wall portion 44 on the opposite side from the side of the side surface 14 are flush with each other. That is, the surface 36 and the surface 46 are positioned on the same flat plane with no step therebetween. The term "flush" as used herein means to be substantially flush. For example, the size of the step between the surface 36 and the surface 46 is less than the thickness of the exterior body 50. In addition, the size of the step between the surface 36 and the surface 46 is equal to or less than 5% of the shorter one of the respective lengths of the first side wall portion 34 and the second side wall portion 44 in the second direction. With the surface 36 and the surface 46 flush with each other, one of the first side wall portion 34 and the second side wall portion 44 does not protrude outward of the battery cell laminated body 10 with respect to the other. Consequently, the housing 20 is uniformly pressurized by atmospheric pressure via the exterior body 50 when the sealed space in the exterior body 50 is depressurized, and an end portion of the first side wall portion 34 and an end portion of the second side wall portion 44 and the exterior body 50, at which a stress tends to concentrate, are not likely to contact each other even if the housing 20 and the exterior body 50 contact each other. As a result, a defect, a break, etc. in the exterior body 50 which starts at an end portion of the first side wall portion 34 or an end portion of the second side wall portion 44 is not likely to occur. Hence, the reliability of the battery 1 can be enhanced. Since there is no step between the surface 36 and the surface 46, a space that does not contribute to the power generation capacity is not formed by a step, which further improves the volumetric energy density of the battery 1. The surface 36 and the surface 46 may not be flush with each other if the first projecting regions 35 and the second projecting regions 45 partially overlap each other when viewed from the third direction.

The first projecting regions 35 and the second projecting regions 45 which are adjacent to each other in the third direction contact each other. Consequently, misalignment of the first housing portion 30 and the second housing portion 40 in the third direction is suppressed. Therefore, a damage to the battery cell laminated body 10 is suppressed when external impact in the third direction is applied. Hence, the reliability of the battery 1 is improved. In the illustrated example, all the first projecting regions 35 and the second projecting regions 45 that are adjacent to each other in the third direction contact each other. However, only some of the adjacent first projecting regions 35 and second projecting regions 45 may contact each other.

The length of each of the first projecting regions 35 and the second projecting regions 45 in the first direction is less than the length of the battery cell laminated body 10 in the first direction. That is, the battery 1 is designed such that the length of the battery cell laminated body 10 in the first direction is longer than the length of each of the first projecting regions 35 and the second projecting regions 45 in the first direction. In other words, gaps 22 are present between the first projecting regions 35 and the second plate-shaped portion 42 when viewed from the second direction, and end portions of the first projecting regions 35 on the side of the second plate-shaped portion 42 and the second housing portion 40 do not contact each other. Meanwhile, gaps 23 are present between the second projecting regions 45 and the first plate-shaped portion 32 when viewed from the second direction, and end portions of the second projecting regions 45 on the side of the first plate-shaped portion 32 and the first housing portion 30 do not contact each other. Consequently, a pressure corresponding to atmospheric pressure is applied to the battery cell laminated body 10 via the first housing portion 30 and the second housing portion 40 when the sealed space in the exterior body 50 is depressurized. Particularly, the battery cell laminated body 10 is compressed from both sides in the first direction by a pressure corresponding to atmospheric pressure via the first plate-shaped portion 32 and the second plate-shaped portion 42. Consequently, the solid electrolyte, which is relatively soft among the materials that constitute the battery cell laminated body 10, is deformed to reduce gaps between particles of the materials that are present inside the battery cell laminated body 10. In addition, the particles move so as to fill the gaps between the particles of the materials that are present inside the battery cell laminated body 10. As a result, the density of the battery cell laminated body 10 is enhanced to reduce the resistance between the particles while improving the volumetric energy density, which improves the battery characteristics. In addition, generation of dust due to the material of the housing 20 being worn because of contact between the first housing portion 30 and the second housing portion 40 etc. is suppressed since the end portions of the first projecting regions 35 on the side of the second plate-shaped portion 42 and the second housing portion 40 do not contact each other and the end portions of the second projecting regions 45 on the side of the first plate-shaped portion 32 and the first housing portion 30 do not contact each other.

The exterior body 50 covers the housing 20 to protect the battery cell laminated body 10 from moisture, air, etc. While a gap is present between the exterior body 50 and the housing 20 in the illustrated example, the exterior body 50 is caused to tightly contact the housing 20 by depressurizing the sealed space in the exterior body 50 after covering the housing 20, for example. The exterior body 50 may be flexible from the viewpoint of the conformability to the shape of the outer surface of the housing 20. The exterior body 50 is constituted of a laminated film, for example. The laminated film is a film that has a laminated structure of a resin such as a polyethylene resin or a polypropylene resin and metal such as aluminum, and may be a known laminated film. The laminated film has a three-layer structure in which a resin layer, a metal layer, and a resin layer are laminated in this order, for example. The number of the layers of the laminated film is not limited to three, and a laminated film with a number of layers that matches the specifications and the purpose may be used. The exterior body 50 is constituted of a laminated film to be an exterior body that is highly flexible and that has good barrier properties against air and water. The battery 1 may not include the exterior body 50. The battery 1 may be sealed from the outer side of the housing 20 by a sealing member etc. constituted from a sealing resin etc., in place of the exterior body 50.

Manufacturing Method

Next, a method of manufacturing the battery 1 according to the present embodiment will be described. The method of manufacturing the battery 1 to be described below is exemplary, and the method of manufacturing the battery 1 is not limited to the following example.

First, a battery cell laminated body 10 in which a plurality of battery cells 10a are laminated is prepared. The battery cells 10a can be fabricated by a known method such as laminating, through application etc., a positive electrode active material, a solid electrolyte, and a negative electrode active material on a current collector. The battery cell laminated body 10 is formed by laminating the battery cells 10a so as to be connected in series or in parallel.

Next, a first housing portion 30 and a second housing portion 40 of a housing 20 are prepared. For example, the first housing portion 30 and the second housing portion 40 are formed by processing the material of the housing 20 discussed above into the respective shapes of the first housing portion 30 and the second housing portion 40 discussed above using a common processing method such as bending, pressing, and molding.

Next, an upper laminated film and a lower laminated film with a three-layer structure in which a resin layer, an aluminum layer, and a resin layer are laminated in this order, for example, are prepared as the exterior body 50.

The second housing portion 40 is placed on the thus prepared lower laminated film. Further, the battery cell laminated body 10 is placed in a space surrounded by the second plate-shaped portion 42 and the second side wall portion 44 of the second housing portion 40. In this event, the battery cell laminated body 10 is placed such that the second plate-shaped portion 42 and the second main surface 12 of the battery cell laminated body 10 face each other.

Next, the first housing portion 30 is placed on the battery cell laminated body 10 which is placed on the second housing portion 40. In this event, the first housing portion 30 is placed such that the first plate-shaped portion 32 and the first main surface 11 of the battery cell laminated body 10 face each other and such that the first projecting regions 35 and the second projecting regions 45 do not overlap each other when viewed from the second direction, but overlap each other when viewed from the third direction. Consequently, the battery cell laminated body 10 is covered by the housing 20.

Next, the upper laminated film is further placed such that the lower laminated film and the upper laminated film interpose and cover the housing 20.

The upper laminated film and the lower laminated film are shaped into a bag-shaped laminated film by bonding, through thermo-compression bonding, the outer peripheral portions of the upper laminated film and the lower laminated film other than some end portions.

The battery cell laminated body 10 covered by the housing 20 is sealed by the laminated film by depressurizing the sealed space in the bag-shaped laminated film which accommodates the battery cell laminated body 10 covered by the housing 20 and thermo-compression bonding the unbonded portions of the laminated film in a sufficiently depressurized state. The interface resistance at the interface in the solid electrolyte included in the battery cell laminated body 10 can be reduced with the sealed space in the laminated film depressurized and with the battery cell laminated body 10 pressurized by atmospheric pressure, which improves the battery characteristics.

First Modification

A first modification of the embodiment will be described below. In the following description of the first modification of the embodiment, differences from the embodiment will be mainly described, and the description of common features will be omitted or simplified.

Figure 6:
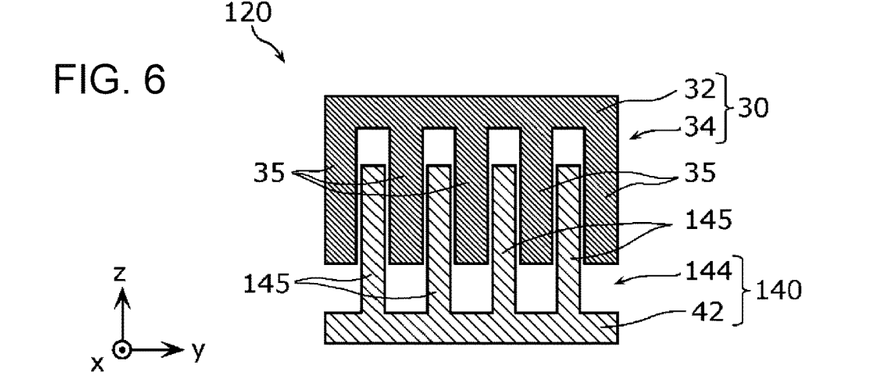
FIG. 6 is a sectional view illustrating a schematic configuration of a housing of a battery according to a first modification of the embodiment.

A battery according to the first modification of the embodiment includes a housing 120 in place of the housing 20 of the battery 1 according to the embodiment. FIG. 6 is a sectional view illustrating a schematic configuration of the housing 120 of the battery according to the present modification. FIG. 6 illustrates a sectional surface of the housing 120 taken at a position that is similar to FIG. 5.

As illustrated in FIG. 6, the housing 120 includes a first housing portion 30 and a second housing portion 140. The second housing portion 140 includes a second plate-shaped portion 42 and a second side wall portion 144 that extends from an end portion of the second plate-shaped portion 42. The second side wall portion 144 includes a plurality of second projecting regions 145 that project in a direction in which the second side wall portion 144 extends. The length of the second projecting regions 145 in the third direction and the length of the first projecting regions 35 in the third direction are different from each other. The length of the second projecting regions 145 in the third direction is shorter than the length of the first projecting regions 35 in the third direction.

The first side wall portion 34 and the second side wall portion 144 do not overlap each other when viewed from the second direction. The first projecting regions 35 and the second projecting regions 145 overlap each other when viewed from the third direction. Consequently, the same effect as that of the embodiment can be obtained.

The plurality of first projecting regions 35 and the plurality of second projecting regions 145 are disposed in a comb teeth arrangement so as to be meshed with each other. That is, the first projecting regions 35 and the second projecting regions 145 are arranged along the third direction.

In the housing 120, gaps are present between the first projecting regions 35 and the second projecting regions 145 which are adjacent to each other in the third direction. Consequently, generation of dust due to the material of the housing 120 being worn because of friction between the first projecting regions 35 and the second projecting regions 145 etc. is suppressed. Hence, it is possible to reduce the possibility that the material of the housing 20 adheres to the battery cell laminated body 10 to cause a reduction in the performance of the battery cell laminated body 10, a short circuit, etc., which improves the reliability of the battery. In the case where the housing 120 is constituted of an insulating material, electrification due to friction between the first projecting regions 35 and the second projecting regions 145 which may affect the battery cell laminated body 10 can be suppressed.

Second Modification

A second modification of the embodiment will be described below. In the following description of the second modification of the embodiment, differences from the embodiment will be mainly described, and the description of common features will be omitted or simplified.

Figure 7:
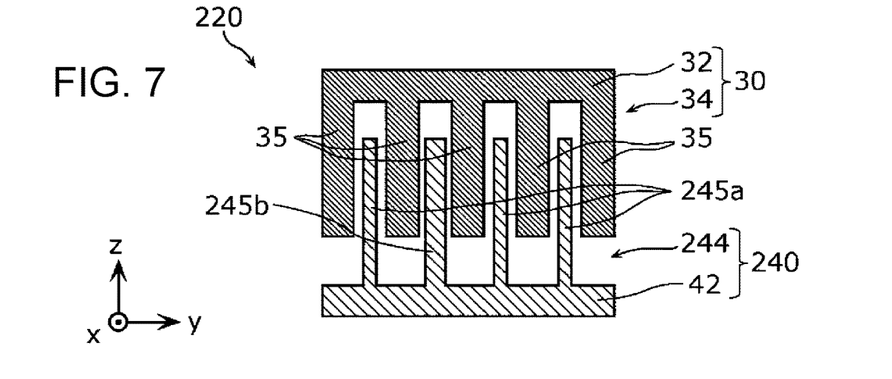
FIG. 7 is a sectional view illustrating a schematic configuration of a housing of a battery according to a second modification of the embodiment.

A battery according to the second modification of the embodiment includes a housing 220 in place of the housing 20 of the battery 1 according to the embodiment. FIG. 7 is a sectional view illustrating a schematic configuration of the housing 220 of the battery according to the present modification. FIG. 7 illustrates a sectional surface of the housing 220 taken at a position that is similar to FIG. 5.

As illustrated in FIG. 7, the housing 220 includes a first housing portion 30 and a second housing portion 240. The second housing portion 240 includes a second plate-shaped portion 42 and a second side wall portion 244 that extends from an end portion of the second plate-shaped portion 42. The second side wall portion 244 includes a plurality of second projecting regions 245a and 245b that project in a direction in which the second side wall portion 244 extends.

The first side wall portion 34 and the second side wall portion 244 do not overlap each other when viewed from the second direction. The first projecting regions 35 and the second projecting regions 245a and 245b overlap each other when viewed from the third direction. Consequently, the same effect as that of the embodiment can be obtained.

The plurality of first projecting regions 35 and the plurality of second projecting regions 245a and 245b are disposed in a comb teeth arrangement so as to be meshed with each other. That is, the first projecting regions 35 and the second projecting regions 245a or 245b are arranged along the third direction.

The second projecting regions 245a and the second projecting region 245b are different from each other in the length in the third direction. That is, the plurality of second projecting regions 245a and 245b do not have a uniform length in the third direction. Specifically, the length of the second projecting region 245b in the third direction is longer than the length of the second projecting regions 245a in the third direction. In addition, gaps between the second projecting region 245b and the first projecting regions 35 which are adjacent to each other in the third direction are smaller than gaps between the second projecting regions 245a and the first projecting regions 35 which are adjacent to each other in the third direction. Consequently, the second projecting region 245b easily contacts the first projecting regions 35, which suppresses misalignment between the first housing portion 30 and the second housing portion 240 in the third direction. Further, the length of the second projecting regions 245a in the third direction is shorter than the length of the second projecting region 245b in the third direction, and therefore the second projecting regions 245a are not likely to contact the first projecting regions 35. Therefore, generation of dust due to the material of the housing 220 being worn because of friction between the first projecting regions 35 and the second projecting regions 245a etc. is suppressed. In the case where the housing 220 is constituted of an insulating material, electrification due to friction between the first projecting regions 35 and the second projecting regions 245a which may affect the battery cell laminated body 10 can be suppressed.

While the respective lengths of the plurality of second projecting regions 245a and 245b in the third direction are not uniform in the present modification, the respective lengths of the plurality of first projecting regions in the third direction may not be uniform. That is, at least either of the respective lengths of the plurality of first projecting regions in the third direction and the respective lengths of the plurality of second projecting regions in the third direction may not be uniform. In addition, gaps may not be present between the second projecting region 245b and the first projecting regions 35 which are adjacent to each other, and the second projecting region 245b and the first projecting regions 35 which are adjacent to each other may contact each other.

Third Modification

A third modification of the embodiment will be described below. In the following description of the third modification of the embodiment, differences from the embodiment will be mainly described, and the description of common features will be omitted or simplified.

Figure 8:
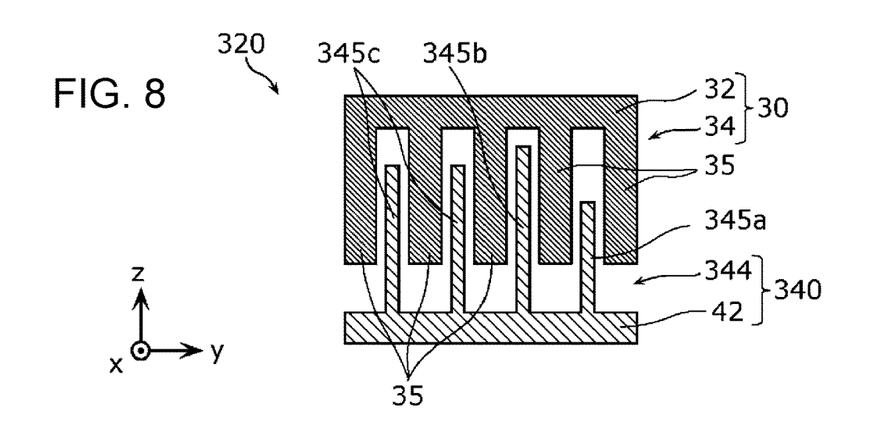
FIG. 8 is a sectional view illustrating a schematic configuration of a housing of a battery according to a third modification of the embodiment.

A battery according to the third modification of the embodiment includes a housing 320 in place of the housing 20 of the battery 1 according to the embodiment. FIG. 8 is a sectional view illustrating a schematic configuration of the housing 320 of the battery according to the present modification. FIG. 8 illustrates a sectional surface of the housing 320 taken at a position that is similar to FIG. 5.

As illustrated in FIG. 8, the housing 320 includes a first housing portion 30 and a second housing portion 340. The second housing portion 340 includes a second plate-shaped portion 42 and a second side wall portion 344 that extends from an end portion of the second plate-shaped portion 42. The second side wall portion 344 includes a plurality of second projecting regions 345a, 345b, and 345c that project in a direction in which the second side wall portion 344 extends.

The first side wall portion 34 and the second side wall portion 344 do not overlap each other when viewed from the second direction. The first projecting regions 35 and the second projecting regions 345a, 345b, and 345c overlap each other when viewed from the third direction. Consequently, the same effect as that of the embodiment can be obtained.

The plurality of first projecting regions 35 and the plurality of second projecting regions 345a, 345b, and 345c are disposed in a comb teeth arrangement so as to be meshed with each other. That is, the first projecting regions 35 and the second projecting regions 345a, 345b, or 345c are arranged along the third direction.

The second projecting region 345a, the second projecting region 345b, and the second projecting regions 345c are different from each other in the length in the first direction. That is, the plurality of second projecting regions 345a, 345b, and 345c do not have a uniform length in the first direction. Specifically, the respective lengths of the second projecting region 345a, the second projecting regions 345c, and the second projecting region 345b in the first direction become longer in this order. In addition, the size of the gap between the second projecting region 345b and the first plate-shaped portion 32 when viewed from the second direction is smaller than the size of the gap between each of the second projecting regions 345a and 345c and the first plate-shaped portion 32. Consequently, the second projecting region 345b and the first housing portion 30 (the first plate-shaped portion 32 of the first housing portion 30 in the present modification) contact each other to function as a stopper when the housing 20 is compressed from both sides in the first direction, which suppresses the battery cell laminated body 10 being compressed to a certain degree or more. In that event, each of the second projecting regions 345a and 345c, which is shorter in the length in the first direction than the second projecting region 345b, is not likely to contact the first plate-shaped portion 32. Therefore, generation of dust due to the material of the housing 320 being worn because of such contact is suppressed.

While the respective lengths of the plurality of second projecting regions 345a, 345b, and 345c in the first direction are not uniform in the present modification, the respective lengths of the plurality of first projecting regions in the first direction may not be uniform. That is, at least either of the respective lengths of the plurality of first projecting regions in the first direction and the respective lengths of the plurality of second projecting regions in the first direction may not be uniform. In the case where the second side wall portion 344 includes regions other than the second projecting regions 345a, 345b, and 345c, the respective lengths from the second plate-shaped portion 42 to the distal end portions of the plurality of second projecting regions 345a, 345b, and 345c in the first direction may not be uniform.

Fourth Modification

A fourth modification of the embodiment will be described below. In the following description of the fourth modification of the embodiment, differences from the embodiment will be mainly described, and the description of common features will be omitted or simplified.

Figure 9:
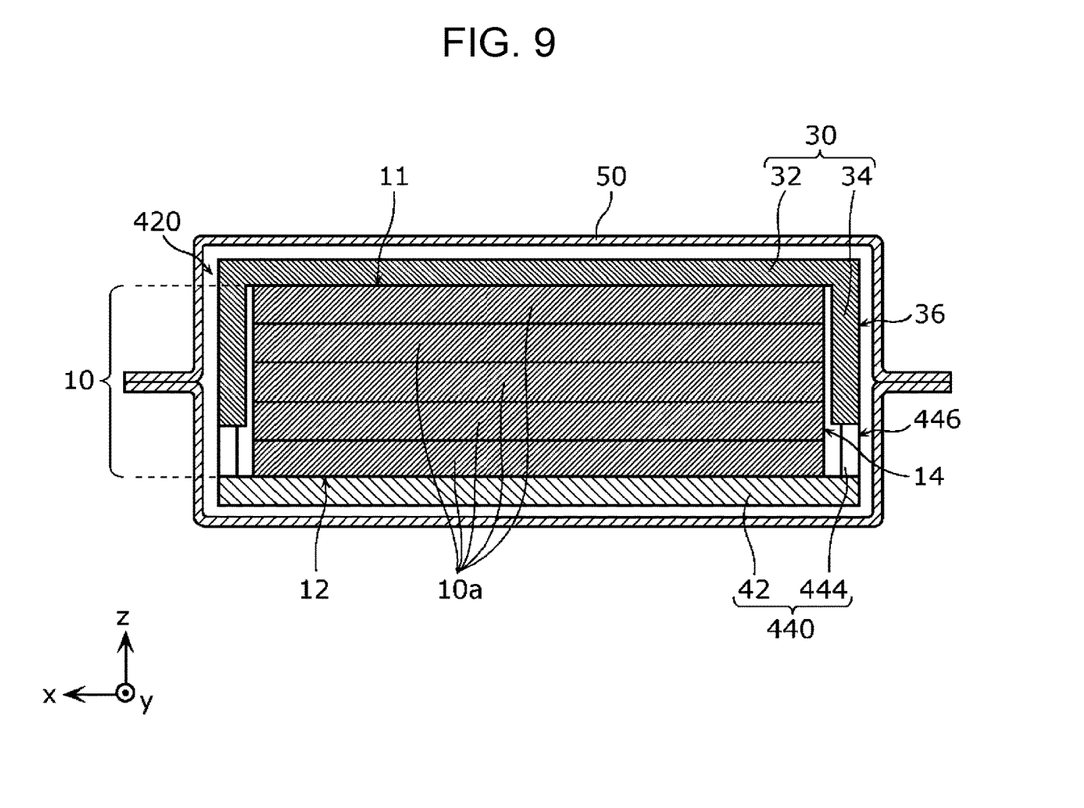
FIG. 9 is a sectional view illustrating a schematic configuration of a housing of a battery according to a fourth modification of the embodiment.

A battery according to the fourth modification of the embodiment includes a housing 420 in place of the housing 20 of the battery 1 according to the embodiment. FIG. 9 is a sectional view illustrating a schematic configuration of the housing 420 of the battery according to the present modification. FIG. 9 illustrates a sectional surface of the housing 420 taken at a position that is similar to FIG. 4.

As illustrated in FIG. 9, the housing 420 includes a first housing portion 30 and a second housing portion 440. The second housing portion 440 includes a second plate-shaped portion 42 and a second side wall portion 444 that extends from an end portion of the second plate-shaped portion 42.

Also in the housing 420, as in the embodiment and the first to third modifications of the embodiment, the first side wall portion 34 and the second side wall portion 444 do not overlap each other when viewed from the second direction, although not illustrated. The first projecting regions of the first side wall portion 34 and the second projecting regions of the second side wall portion 444 overlap each other when viewed from the third direction.

In the housing 420, in addition, the length of the first side wall portion 34 in the second direction and the length of the second side wall portion 444 in the second direction are different from each other. Specifically, the length of the first side wall portion 34 in the second direction is longer than the length of the second side wall portion 444 in the second direction. Consequently, one of the first side wall portion 34 and the second side wall portion 444 is thinner, which reduces the weight of the battery and improves the weight energy density of the battery.

A surface 36 of the first side wall portion 34 on the opposite side from the side of the side surface 14 and a surface 446 of the second side wall portion 444 on the opposite side from the side of the side surface 14 are flush with each other. That is, the surface 36 and the surface 446 are positioned on the same flat plane with no step therebetween. Consequently, contact between an end portion of the first side wall portion 34 and an end portion of the second side wall portion 444 and the exterior body 50 is suppressed when the sealed space in the exterior body 50 is depressurized, even in the case where the length of the first side wall portion 34 in the second direction and the length of the second side wall portion 444 in the second direction are different from each other.

While the length of the first side wall portion 34 in the second direction is longer than the length of the second side wall portion 444 in the second direction in the present modification, the present disclosure is not limited thereto. The length of the second side wall portion 444 in the second direction may be longer than the length of the first side wall portion 34 in the second direction.

In the housing 420, the first side wall portion 34 and the second side wall portion 444 are positioned on both sides of the battery cell laminated body 10 so as to interpose the battery cell laminated body 10 in the x-axis direction. While the length of the first side wall portion 34 in the second direction is longer than the length of the second side wall portion 444 in the second direction in each of the first side wall portions 34 and the second side wall portions 444 on both sides, the present disclosure is not limited thereto. In the housing 420, the length of the first side wall portion 34 in the second direction may be longer than the length of the second side wall portion 444 in the second direction, or the length of the second side wall portion 444 in the second direction may be longer than the length of the first side wall portion 34 in the second direction, in the first side wall portion 34 and the second side wall portion 444 on either side. In the housing 420, alternatively, the length of the first side wall portion 34 in the second direction and the length of the second side wall portion 444 in the second direction may be equal to each other in the first side wall portion 34 and the second side wall portion 444 on either side.

OTHER EMBODIMENTS

While the battery according to the present disclosure has been described above on the basis of an embodiment, the present disclosure is not limited to the embodiment. Embodiments that have been subjected to various modifications conceived of by a person skilled in the art and other aspects constituted by combining some of the constituent elements of the embodiment are also included in the scope of the present disclosure unless such embodiments or aspects depart from the scope and spirit of the present disclosure.

For example, while the first side wall portion and the second side wall portion are each provided at four locations so as to face each of the four side surfaces of the battery cell laminated body in the embodiment described above, the present disclosure is not limited thereto. The first side wall portion and the second side wall portion may each be provided at one to three locations. For example, the first side wall portion and the second side wall portion may be provided only at a location at which the first side wall portion and the second side wall portion are likely to receive external impact.

While the plurality of first projecting regions are arranged at equal intervals along the third direction in the embodiment described above, the present disclosure is not limited thereto. The pitch of the plurality of first projecting regions arranged along the third direction may not be uniform. For example, two second projecting regions may be provided between adjacent first projecting regions.

While the first projecting regions and the second projecting regions have a rectangular shape when viewed from the second direction in the embodiment described above, the present disclosure is not limited thereto. For example, the first projecting regions and the second projecting regions may have a quadrangular shape other than a rectangular shape such as a trapezoidal shape, a triangular shape, or a polygonal shape such as a pentagonal shape when viewed from the second direction. The first projecting regions and the second projecting regions may also have a rounded distal end portion. Generation of dust due to the distal end portion being worn can be suppressed if the distal end portion is rounded.

While gaps are present between the first projecting regions and the second plate-shaped portion when viewed from the second direction and end portions of the first projecting regions on the side of the second plate-shaped portion and the second housing portion do not contact each other in the embodiment described above, the present disclosure is not limited thereto. For example, no gaps may be present between the first projecting regions and the second plate-shaped portion, and end portions of the first projecting regions on the side of the second plate-shaped portion and the second housing portion may contact each other. Even in the case where end portions of the first projecting regions on the side of the second plate-shaped portion and the second housing portion contact each other, the battery cell laminated body can be pressurized from both sides in the first direction by using a material with such a modulus of elasticity that enables deformation at atmospheric pressure. The same also applies to the gaps between the second projecting regions and the first plate-shaped portion.

In the embodiment described above, there may be unevenness due to the difference in the size of the layers on a side surface of the battery cell laminated body, for example. In that case, the direction that connects between an end portion of the first main surface and an end portion of the second main surface, which are at overlapping positions when viewed from the first direction, may be the direction in which a side surface of the battery cell laminated body extends.

While the first side wall portion is constituted from a plurality of first projecting regions in the embodiment described above, the present disclosure is not limited thereto. For example, the first side wall portion may have a region having the same width as the width of an end portion of the first plate-shaped portion and provided to extend from the end portion of the first plate-shaped portion, and at least one first projecting region may be formed on the opposite side of the region from the first plate-shaped portion. The same also applies to the second side wall portion.

While the battery cell laminated body has a rectangular parallelepiped shape in the embodiment described above, the present disclosure is not limited thereto. For example, the battery cell laminated body may have a polygonal column shape, or may have a circular column shape.

A variety of modifications, replacements, additions, omissions, etc. may be made to the embodiment described above within the scope of the claims and equivalents thereof.

The battery according to the present disclosure can be used as a battery that includes a housing that protects a battery cell laminated body from external impact.

What is claimed is:

1. A battery, comprising:
   a power generation element that includes a structural body in which a positive electrode, an electrolyte, and a negative electrode are laminated in a laminating direction;
   a housing that accommodates the power generation element; and
   an exterior body that accommodates the power generation element and the housing,
   wherein the power generation element includes:
      a first main surface perpendicular to the laminating direction;
      a second main surface opposite from the first main surface; and
      a side surface parallel to the laminating direction, the housing includes:
      a first housing portion that includes
         a first plate-shaped portion that faces the first main surface, and
         a first side wall portion that extends from a first outer edge of the first plate-shaped portion in a first direction, the first side wall portion facing the side surface; and
      a second housing portion that includes
         a second plate-shaped portion that faces the second main surface, and
         a second side wall portion that extends from a second outer edge of the second plate-shaped portion in a second direction opposite to the first direction, the second side wall portion facing the side surface,
   the first side wall portion includes a plurality of first projecting regions that project in the first and are arranged along the first outer edge,
   the second side wall portion includes a plurality of second projecting regions that project in the second direction and are arranged along the second outer edge,
   one of the plurality of first projecting regions is slidably engaged with adjacent two of the plurality of second projecting regions, and
   one of the plurality of second projecting regions is slidably engaged with adjacent two of the plurality of first projecting regions.

2. The battery according to claim 1,
   wherein a first surface of the first side wall portion on a side opposite from the side surface and a second surface of the second side wall portion on the side opposite from the side surface are positioned on a same flat plane.

3. The battery according to claim 1,
   wherein a first projecting region of the plurality of first projecting regions is in direct contact with a second projecting region, which is adjacent to the first projection region, of the plurality of second projecting regions.

4. The battery according to claim 1,
   wherein a gap is present between a first projecting region of the plurality of first projecting regions and a second projecting region, which is adjacent to the first projection region, of the plurality of second projecting regions.

5. The battery according to claim 1,
   wherein a first gap is present between the one of the plurality of first projecting regions and the second plate-shaped portion, and
   a second gap is present between the one of the plurality of second projecting regions and the first plate-shaped portion.

6. The battery according to claim 1,
   wherein at least one of:
      respective widths of the plurality of first projecting regions in a first arrangement direction, in which the plurality of first projecting regions is aligned, are not uniform, or
      respective widths of the plurality of second projecting regions in a second arrangement direction, in which the plurality of second projecting regions is aligned, are not uniform.

7. The battery according to claim 1,
   wherein at least one of:
      respective lengths of the plurality of first projecting regions in the first direction are not uniform, or
      respective lengths of the plurality of second projecting regions in the second direction are not uniform.

8. The battery according to claim 1,
   wherein a first length of the first side wall portion in the second direction and a second length of the second side wall portion in the second direction are different.

9. The battery according to claim 1,
   wherein the exterior body is flexible.

10. The battery according to claim 1,
    wherein the exterior body is constituted of a laminated film.

11. The battery according to claim 1,
    wherein the electrolyte includes a solid electrolyte that has lithium ion conductivity.

12. The battery according to claim 1,
wherein a first end of the one of the plurality of first projecting regions is located between the adjacent two of the plurality of second projecting regions and faces the second plate-shaped portion with a first gap in the first direction, and
a second end of the one of the plurality of second projecting regions is located between the adjacent two of the plurality of first projecting regions and faces the first plate-shaped portion with a second gap in the second direction.

* * * * *